(12) United States Patent
Jain et al.

(10) Patent No.: US 12,530,180 B2
(45) Date of Patent: Jan. 20, 2026

(54) SYSTEM AND METHOD FOR CONFIGURING APPLICATION CONFIGURATIONS USING ADVANCED COMPUTATIONAL MODELS FOR DATA ANALYSIS AND AUTOMATED DECISION-MAKING

(71) Applicant: BANK OF AMERICA CORPORATION, Charlotte, NC (US)

(72) Inventors: Amit Anil Jain, Hockessin, DE (US); Yog Hari, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 326 days.

(21) Appl. No.: 18/243,797

(22) Filed: Sep. 8, 2023

(65) Prior Publication Data

US 2025/0085947 A1 Mar. 13, 2025

(51) Int. Cl.
| | |
|---|---|
| *G06F 9/445* | (2018.01) |
| *G06F 8/40* | (2018.01) |
| *G06F 8/61* | (2018.01) |
| *G06F 8/71* | (2018.01) |
| *G06F 9/451* | (2018.01) |
| *G06F 9/455* | (2018.01) |
| *H04L 29/08* | (2006.01) |

(52) U.S. Cl.
CPC ................ *G06F 8/61* (2013.01); *G06F 8/71* (2013.01); *G06F 9/451* (2018.02)

(58) Field of Classification Search
CPC ..... G06F 8/65; G06F 8/61; G06F 8/71; G06F 8/72; G06F 9/451; G06F 11/3476; G06F 11/1433; G06F 9/52; G06F 9/4856; G06F 9/5083; G06F 9/45558; G06F 11/3452; G06F 9/44505
See application file for complete search history.

(56) References Cited

U.S. PATENT DOCUMENTS

| | | | |
|---|---|---|---|
| 8,914,789 B2 | 12/2014 | Barros | |
| 10,182,129 B1 * | 1/2019 | Peterson | ............. G06F 11/3006 |
| 10,248,554 B2 | 4/2019 | Kielstra | |
| 10,331,419 B2 | 6/2019 | Essenmacher | |
| 10,331,421 B2 | 6/2019 | Essenmacher | |

(Continued)

*Primary Examiner* — Thuy Dao
(74) *Attorney, Agent, or Firm* — Moore & Van Allen PLLC; William Walters

(57) ABSTRACT

Systems, computer program products, and methods are described herein for configuring application configurations using advanced computational models for data analysis and automated decision-making. The present disclosure is configured to receive, from a user, one or more application configurations, wherein the application configurations comprise configurations to one or more log files; receive, in response to the one or more application configurations, one or more approvals, wherein the one or more approvals are associated with an administrator; update one or more applications with the one or more application configurations, wherein the update is associated with a version control tool, and wherein the version control tool stores the one or more application configurations; transmit the one or more applications to a production environment; and generate a change interface component, wherein the change interface component comprises data associated with the one or more applications.

20 Claims, 6 Drawing Sheets

```
                              300
```

CREATE A CATALOG, WHEREIN THE CATALOG COMPRISES ONE OR MORE SUGGESTED APPLICATION CONFIGURATIONS
302

RECEIVE, FROM THE USER, A USER SELECTION, WHEREIN THE USER SELECTION COMPRISES THE ONE OR MORE SUGGESTED APPLICATION CONFIGURATIONS
304

IMPLEMENT, IN RESPONSE TO THE USER SELECTION, THE ONE OR MORE SUGGESTED APPLICATION CONFIGURATIONS
306

(56) References Cited

U.S. PATENT DOCUMENTS

| | | | |
|---|---|---|---|
| 10,353,913 B2 | 7/2019 | Dhayapule | |
| 10,366,112 B2 | 7/2019 | Dhayapule | |
| 10,452,371 B2 | 10/2019 | Bland | |
| 10,621,072 B2 | 4/2020 | Conti | |
| 10,713,097 B2 | 7/2020 | Asthana | |
| 10,936,476 B2 | 3/2021 | Padilla-Ruberte | |
| 10,956,285 B2 | 3/2021 | Choi | |
| 11,018,955 B2 | 5/2021 | Bagarolo | |
| 11,030,072 B2 | 6/2021 | Huang | |
| 11,055,134 B2 | 7/2021 | Essenmacher | |
| 11,061,718 B2 | 7/2021 | Vukovic | |
| 11,195,137 B2 | 12/2021 | Kushida | |
| 11,340,940 B2 * | 5/2022 | Savant | G06F 11/3414 |
| 2022/0206786 A1 | 6/2022 | Silva | |
| 2022/0391311 A1 | 12/2022 | Zhang | |
| 2023/0229581 A1 | 7/2023 | Li | |

\* cited by examiner

SYSTEM AND METHOD FOR CONFIGURING APPLICATION CONFIGURATIONS USING ADVANCED COMPUTATIONAL MODELS FOR DATA ANALYSIS AND AUTOMATED DECISION-MAKING

TECHNOLOGICAL FIELD

Example embodiments of the present disclosure relate to configuring application configurations using advanced computational models for data analysis and automated decision-making.

BACKGROUND

There are significant challenges associated with centralized log management systems. Applicant has identified a number of deficiencies and problems associated with configuring application configurations using advanced computational models for data analysis and automated decision-making. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for configuring application configurations using advanced computational models for data analysis and automated decision-making.

Embodiments of the present invention address the above needs and/or achieve other advantages by providing apparatuses (e.g., a system, computer program product, and/or other devices) and methods for configuring application configurations using advanced computational models for data analysis and automated decision-making. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention receives, from a user, one or more application configurations, wherein the application configurations comprise configurations to one or more log files. In some embodiments, the present invention receives, in response to the one or more application configurations, one or more approvals, wherein the one or more approvals are associated with an administrator. In some embodiments, the present invention updates one or more applications with the one or more application configurations, wherein the update is associated with a version control tool, and wherein the version control tool stores the one or more application configurations. In some embodiments, the present invention transmits the one or more applications to a production environment. In some embodiments, the present invention generates a change interface component, wherein the change interface component comprises data associated with the one or more applications.

In some embodiments, receiving the one or more application configurations includes receiving, from the user, the one or more application configurations, wherein the user is a subject matter expert. In some embodiments, receiving the one or more application configurations includes permitting, based on a subject matter of the one or more application configurations, the user to reconfigure the one or more application configurations.

In some embodiments, receiving, from the user, the one or more application configurations includes receiving, from the user, a request for the application configuration. In some embodiments, receiving, from the user, the one or more application configurations includes creating, using an artificial intelligence model, one or more configuration recommendations in response to the request for the application configuration. In some embodiments, implementing, in response to the user selecting the one or more configuration recommendations, the one or more configuration recommendations.

In some embodiments, generating the change interface component includes transmitting, to a user device, the change interface component, wherein the change interface component configures a graphical user interface of the user device.

In some embodiments, the production environment includes one or more devices.

In some embodiments, the present invention monitors the version control tool for a latest application configuration, wherein the version control tool is monitored on a time interval. In some embodiments, the present invention transmits the latest application configuration to the production environment on a regular time interval.

In some embodiments, the present invention creates a catalog, wherein the catalog includes one or more suggested application configurations. In some embodiments, the present invention receives, from the user, a user selection, wherein the user selection includes the one or more suggested application configurations. In some embodiments, the present invention implements, in response to the user selection, the one or more suggested application configurations.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany-

Figure 1A:
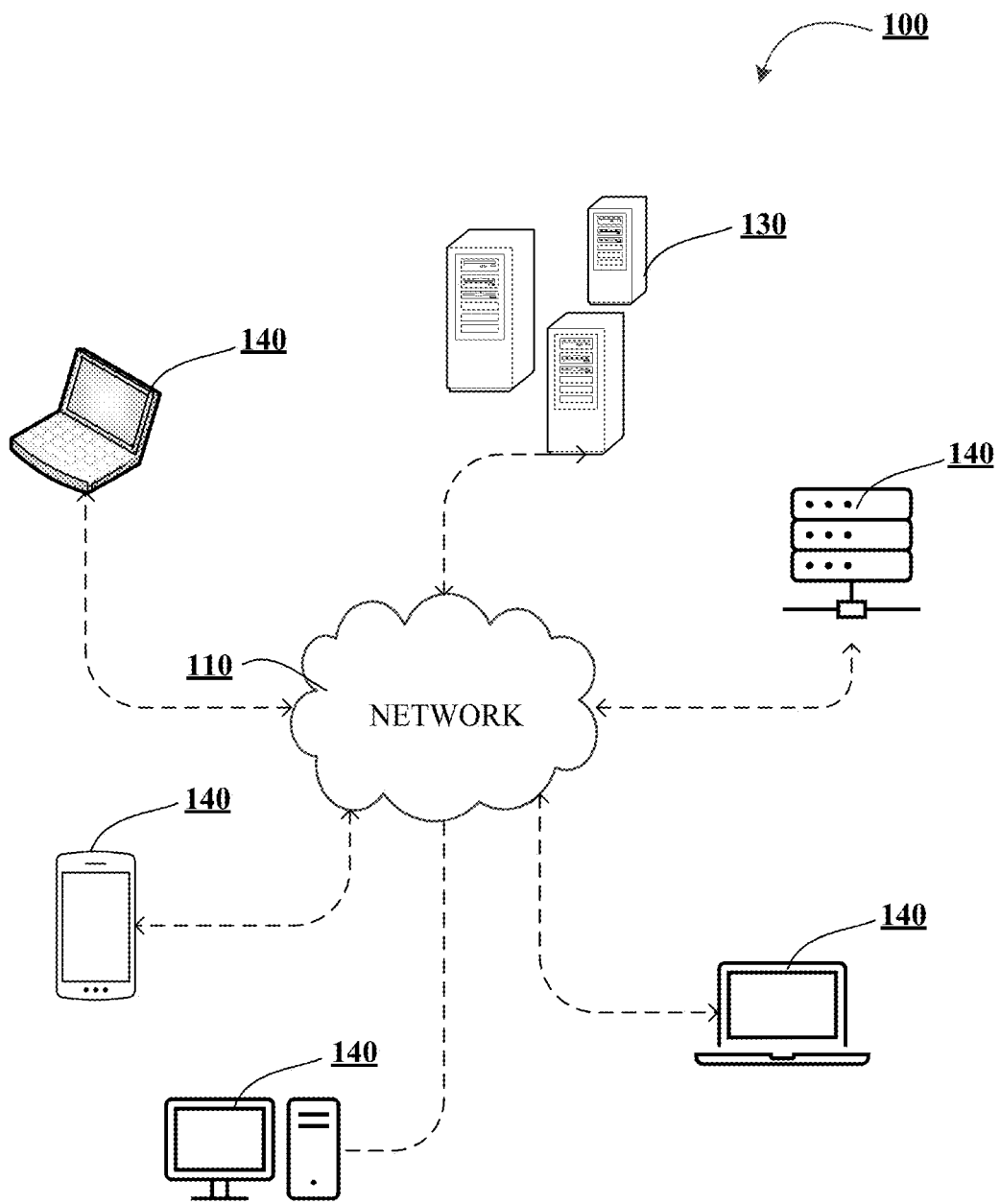
Figure 1B:
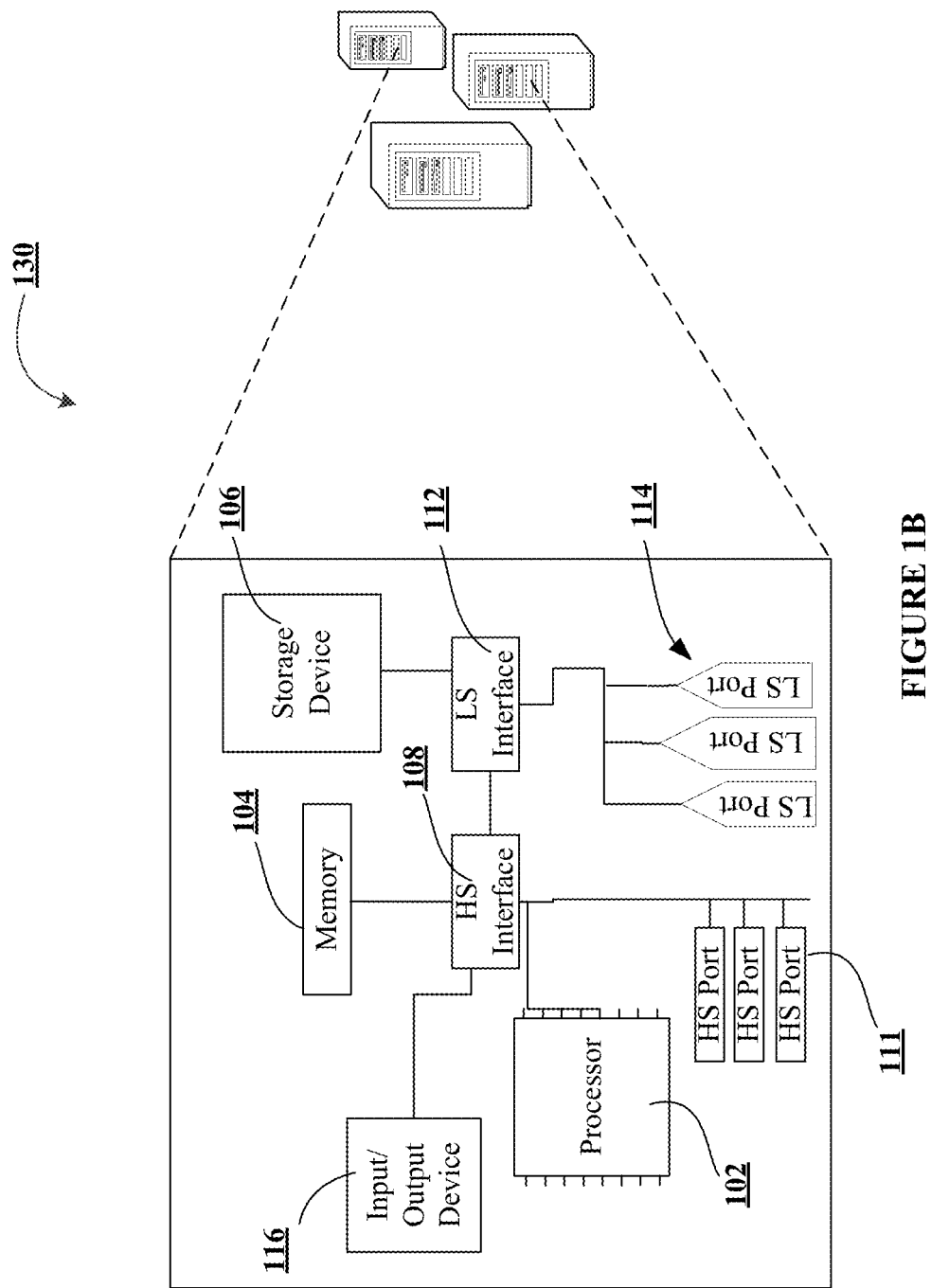
Figure 1C:
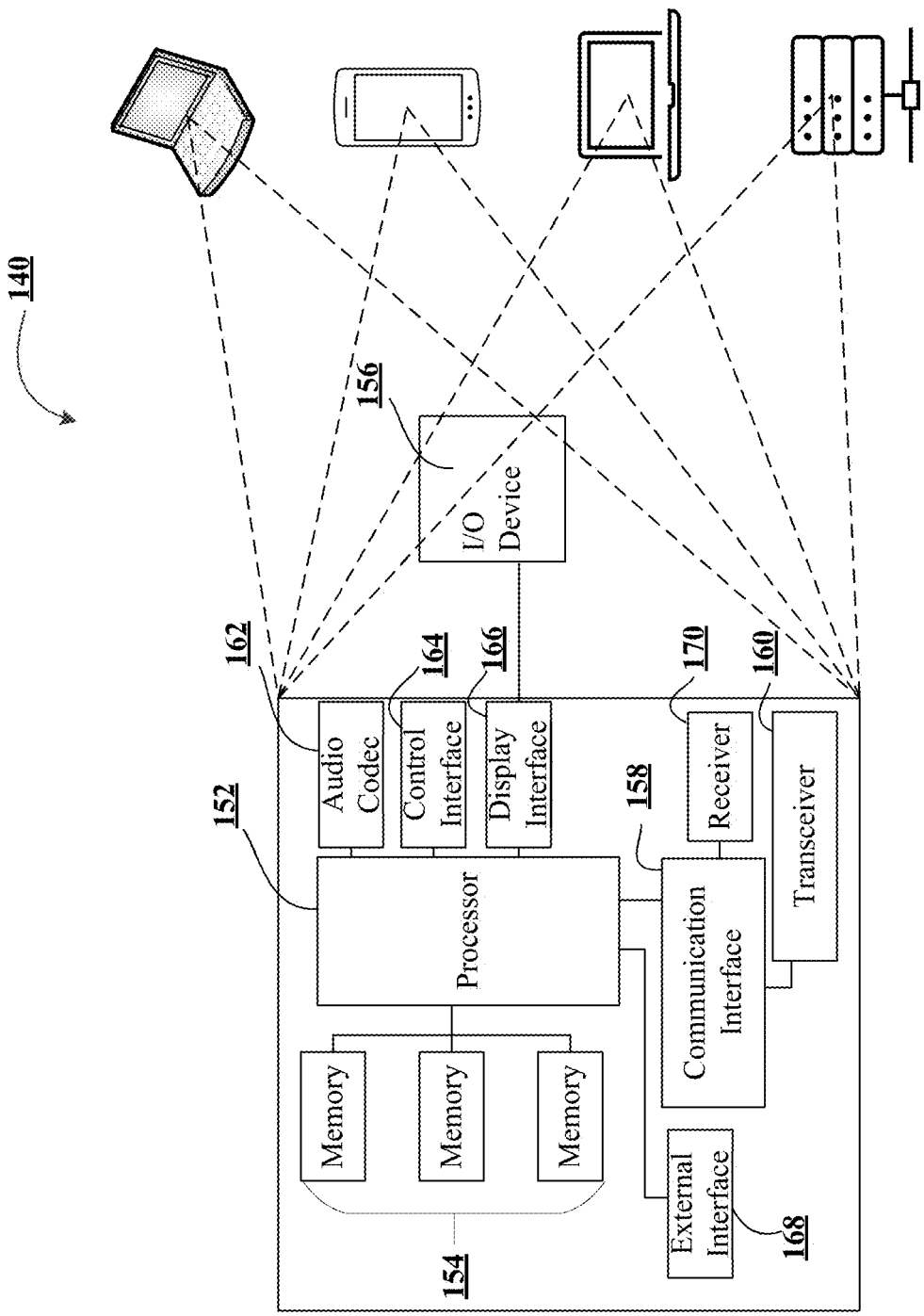
Figure 2:
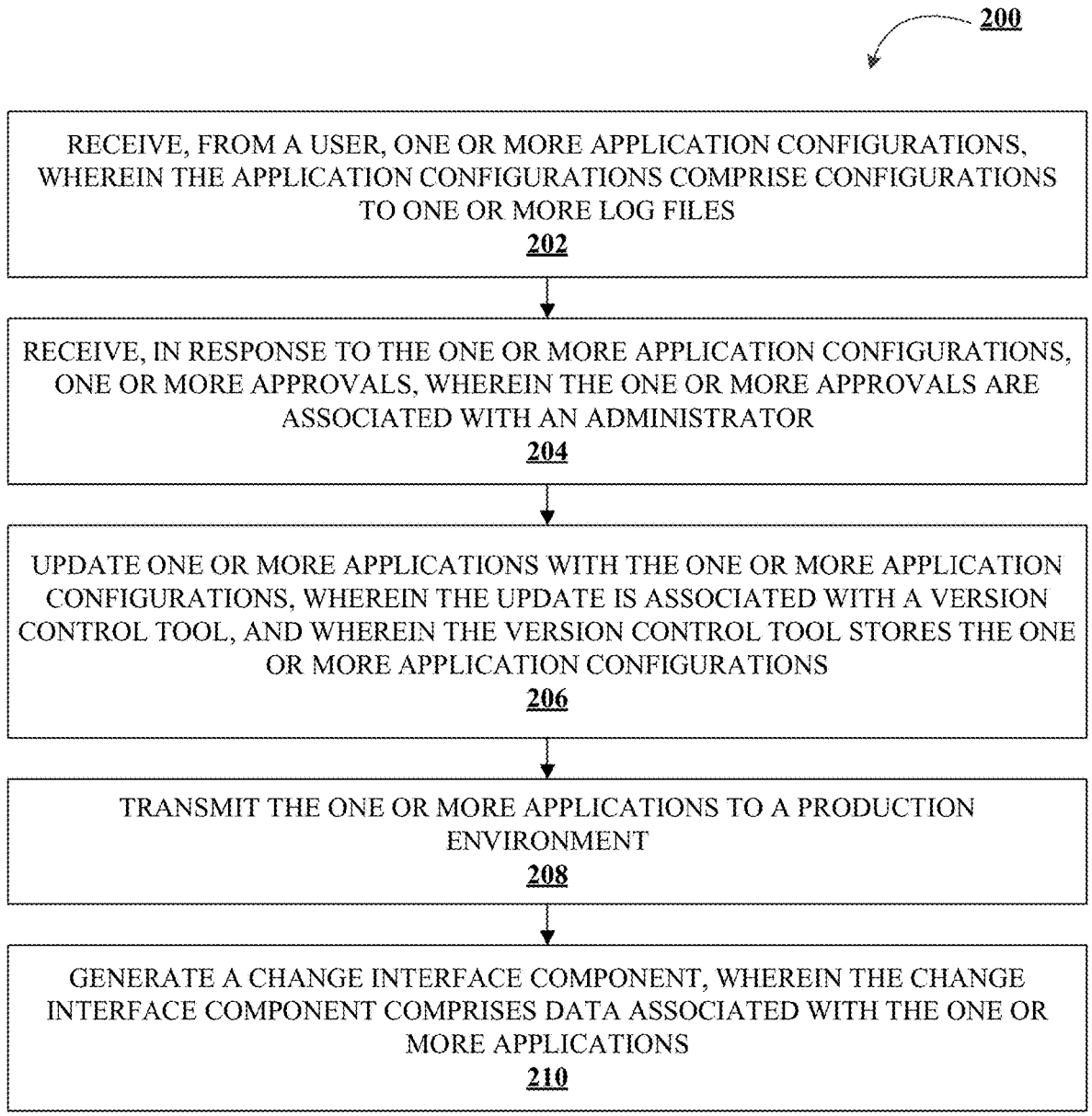

FIGS. 1A-1C illustrates technical components of an exemplary distributed computing environment for configuring application configurations using advanced computational models for data analysis and automated decision-making, in accordance with an embodiment of the disclosure;

FIG. 2 illustrates a process flow for configuring application configurations using advanced computational models for data analysis and automated decision-making, in accordance with an embodiment of the disclosure.

Figure 3:
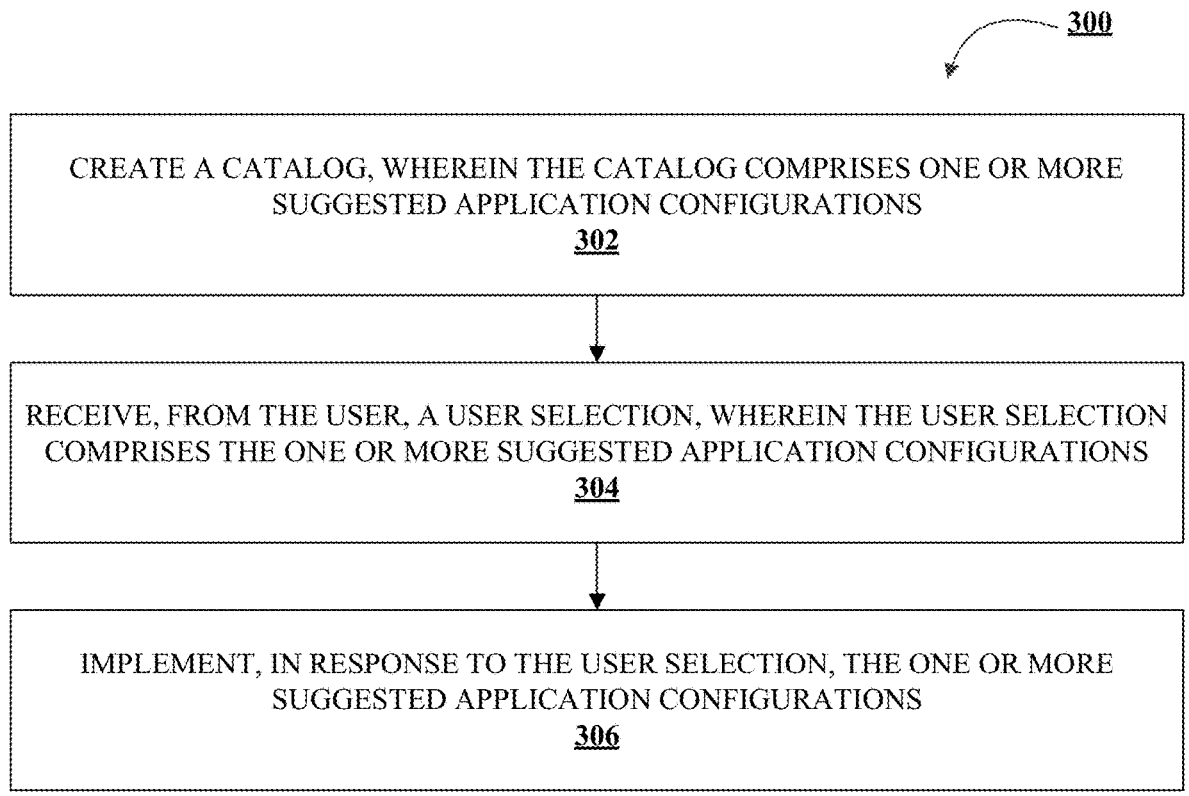

FIG. 3 illustrates a process flow for implementing one or more suggested application configurations.

Figure 4:
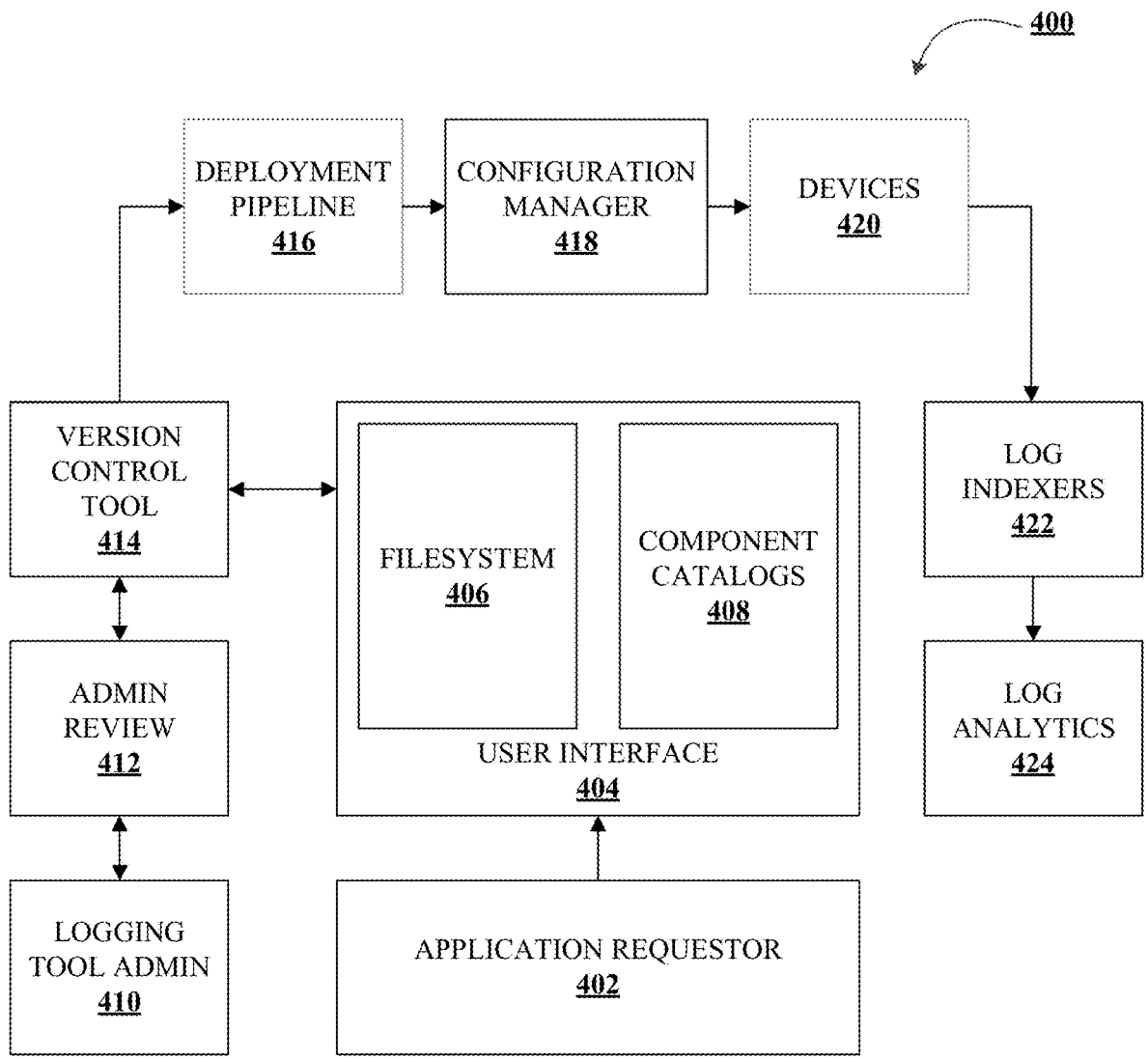

FIG. 4 illustrates a process flow of an example process associated with example embodiments described herein.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Logs are the text files that capture application activities, platform activities, network activities, device activities, and/or other activities. Centralized log management is a regulatory requirement hence every application needs to configure log paths and formats in a log aggregation tool. A typical log collection configuration includes log path(s), application server name(s), log destinations and/or the like. In response to the configurations for the log files changing (e.g., application configurations), there is a very high volume of requests for administrators of systems that implement and use such log files. Administrative teams associated with approving, denying, reviewing, and/or the like, the application configurations (e.g., changes to log files, log formats, or other log configurations) become overwhelmed and are unable to fulfill requests in a timely manner. In response, this leads to an impact to system degradation, application development, production support, and/or the like in the environment due to absence of log files. Over-encumbered administrative teams face the issue of being the only teams to submit log configuration (e.g., application configuration) changes, severely limiting the quantity of requests those teams can handle. Therefore, there is a need to improve a configuration workflow manager which has self-service capabilities.

The system provides subject matter experts to visualize, understand, and edit log configuration files (e.g., application configurations) by themselves. The system adapts automated platforms to provide continuous integration and deployment of the application configurations. The subject matter experts may visualize the application configurations in a catalog, which may help them select which application configuration is appropriate for their specific needs. After the subject matter experts submit changes (e.g., application configurations), an administrative team may approve the changes submitted to the version control tool. Further, the subject matter experts may visualize the application configurations running in the applications through a log analytics tool.

What is more, the present disclosure provides a technical solution to a technical problem. As described herein, the technical problem includes the issue of administrative teams over consuming resources in response to submitting application configurations on behalf of subject matter experts. The technical solution presented herein allows for subject matter experts to submit application configurations themselves, which allows for a less intensive application configuration submission process by distributing workloads across different teams. In particular, the application configuration system is an improvement over existing solutions to the issue of administrative teams submitting application configurations, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for configuring application configurations using advanced computational models for data analysis and automated decision-making, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 is a process flow 200 which illustrates a process flow for configuring application configurations using advanced computational models for data analysis and automated decision-making, in accordance with an embodiment of the disclosure. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, an application configuration system (e.g., similar to one or more of the systems described herein with respect to FIGS. 1A-1C) may perform one or more of the steps of process flow 200. For example, an application configuration system (e.g., the system 130 described herein with respect to FIGS. 1A-1C) may perform the steps of process flow 200.

As shown in block 202, the process flow 200 of this embodiment includes receive, from a user, one or more application configurations, wherein the application configurations comprise configurations to one or more log files. In some embodiments, the one or more log files may include text files that capture application activities, platform activities, network activities, device activities, and/or the like. In some embodiments, the log files may include a centralized log management system, wherein the centralized log management system includes regulatory requirements that define log paths and log formats in a log aggregation tool. In some embodiments, a log aggregation tool may include a log collection configuration. In some embodiments, the log collection configuration may include log paths, application server names, log destinations, and/or the like.

In some embodiments, the application configurations may include configurations to the log files. In some embodiments, the application configurations may include configurations to change logging levels (e.g., severity of events), altering the log format (e.g., formatting log files in response to the analysis), change log rotation settings (e.g., how the system handles old log files), filtering events (e.g., specifying which events should and should not be logged), output destinations (e.g., directed log files to specific destinations), and/or the like.

In some embodiments, receiving the one or more application configurations includes receiving, from the user, the one or more application configurations, wherein the user is a subject matter expert. In some embodiments, the user being a subject matter expert may include the user have a specific knowledge in a subject matter. In some embodiments, the subject matter expert may have licenses or certifications in subject matter areas, may have experience in the subject matter area, and/or the like. For instance, and by way of non-limiting example, if a user may be defined as a subject matter expert in software development, network administration, cybersecurity, database management, cloud computing, infrastructure technology project management, system analysis, development operations, artificial intelligence, machine learning, data science, and/or the like.

In some embodiments, receiving the one or more application configurations includes permitting, based on a subject matter of the one or more application configurations, the user to reconfigure the one or more application configurations. In some embodiments, the subject matter and the subject matter expertise may align. In some embodiments, the application configuration system may allow a subject matter expert to configure (e.g., reconfigure) an application without restriction if the subject matter of the application configuration and the subject matter expertise of the user align. In some embodiments, if the subject matter of the application configuration and the user is not a subject matter expert in that area, the system may require an additional approval, perform an uncertainty analysis, deny the application configuration, and/or the like.

In some embodiments, receiving, from the user, the one or more application configurations includes receiving, from the user, a request for the application configuration. In some embodiments, the request for the application configuration may include receiving a prompt from the user describing the application configuration the user wishes to implement. For instance, and by way of non-limiting example, the user may prompt the application configuration system to reconfigure a specific logging destination. In this way, the user may describe the destination the user wishes the logging destination to be associated with, which may be interpreted by the application configuration system.

In some embodiments, receiving, from the user, the one or more application configurations includes creating, using an artificial intelligence model, one or more configuration recommendations in response to the request for the application configuration.

In some embodiments, the artificial intelligence system may use tools to create the configuration recommendations, such as collaborative filtering, content-based filtering, deep learning models, natural language processing, reinforcement learning, hybrid models, autoencoders, and/or the like. In some embodiments, the configuration recommendations may include instructions (e.g., instructions on how to configure a specific application), model application configurations (e.g., generic, unspecific application configurations which may be customized by the user), specific application configuration (e.g., application configurations specific to the user request), and/or the like. In some embodiments, the artificial intelligence model may anticipate the user request when creating the application configurations.

In some embodiments, receiving, from the user, the one or more application configurations includes implementing, in response to the user selecting the one or more configuration recommendations, the one or more configuration recommendations.

In some embodiments, the application configuration system may implement the configuration recommendations to one or more applications. In some embodiments, implementing the configuration recommendations may include an approval process, wherein an administrator of the application configuration system approves the configuration recommendations.

As shown in block 204, the process flow 200 of this embodiment includes receive, in response to the one or more application configurations, one or more approvals, wherein the one or more approvals are associated with an administrator. In some embodiments, the administrator may be associated with an entity that is associated with the application configuration system. In some embodiments, the administrator may be associated with a third-party entity with access to the application configuration system. In some embodiments, the administrator may manually approve the one or more application configurations. In some embodiments, the administrator may use an artificial intelligence model to approve the one or more application configurations. In some embodiments, the application configuration system may use the artificial intelligence model to approve the application configurations (e.g., the application configuration system may act as an administrator approving the application configurations).

In some embodiments, the application configurations may be sent to an approval process. In some embodiments, the approval process may include an uncertainty assessment process. In some embodiments, the uncertainty assessment may include determining security implications, potential impacts on the system's (e.g., the application configuration system) performance, compliance with rules, laws, regulations, and/or the like. In some embodiments, the application configuration system may evaluate the uncertainty associated with an application configuration by determining potential downtime of the system, loss of data, compliance data, potential reputational damage, and/or the like. In some embodiments, the application configuration system may categorize the uncertainties associated with the application configurations. In some embodiments, the uncertainty assessment may include determining strategies to reduce uncertainties, such as limiting likelihood of uncertainty or limiting impact of uncertainties associated with application configurations.

As shown in block 206, the process flow 200 of this embodiment includes update one or more applications with the one or more application configurations, wherein the update is associated with a version control tool, and wherein the version control tool stores the one or more application configurations. In some embodiments, the version control tool may store the changes (e.g., configurations) made to the applications. In some embodiments, the version control tool may continuously update to include any additional application configurations. In some embodiments, the version control tool may allow for a reversion of an application to a previous configuration. In some embodiments, the version control tool may include a centralized version control system (e.g., a central server, repository, bank, and/or the like that allows users to access), a distributed version control system (e.g., distributed main repository to each user), and/or the like.

In some embodiments, the version control tool may include features such as concurrency management (e.g., allowing simultaneous configurations, reconfigurations, edits, and/or the like to a particular application), change history (e.g., tracking and maintaining changes made in the system), branching (e.g., isolating specific changes), merging (e.g., consolidating changes), conflict resolution (e.g., highlighting conflicts for manual review), and/or the like. In some embodiments, the application configurations may be ran through the version control tool for storage of the configurations as part of the approval process. For instance, and by way of non-limiting example, an application configuration may include multiple changes by multiple users and the version control may highlight any appropriate conflicts associated with the application configuration.

In some embodiments, the application configuration system may continuously pull the latest versions of the application configurations from the version control tool. In this way, the application configuration system may maintain an updated version for each application associated with the system.

As shown in block 208, the process flow 200 of this embodiment includes transmit the one or more applications to a production environment. In some embodiments, transmitting applications to a production environment may include several stages, such as configuration review and testing, staging, deployment, and/or the like. In some embodiments, transmitting the applications to a production environment may include using the version control tool to ensure the most updated version of the configurations are transmitted to the production environment.

In some embodiments, the production environment comprises one or more devices. In some embodiments, the devices may include mobile devices, personal computers, workstations, servers, ATMs, and/or the like. In some embodiments, the devices may be included in the network (e.g., network 110).

As shown in block 210, the process flow 200 of this embodiment includes generate a change interface component, wherein the change interface component comprises data associated with the one or more applications. In some embodiments, generating the change interface component includes transmitting, to a user device, the change interface component, wherein the change interface component configures a graphical user interface of the user device. In some embodiments, the user device may be associated with a user of the application configuration system (e.g., production support, application developers, administrators, managers, and/or the like). In some embodiments, the change interface component may provide information associated with the application configurations, which may include the ability of the user to visualize, validate, commit, and/or the like, the application configurations. In some embodiments, the version control tool may include the change interface component, wherein the user may login to the version control tool to visualize, validate, commit, and/or the like the application configurations.

In some embodiments, the application configuration system may monitor the version control tool for a latest application configuration, wherein the version control tool is monitored on a time interval. In some embodiments, the time interval may be set by the application configuration, a user associated with the application configuration system, and/or the like.

In some embodiments, the application configuration system may transmit the latest application configuration to the production environment on a regular time interval.

FIG. 3 is a process flow 300 which illustrates a process flow for implementing one or more suggested application configurations, in accordance with an embodiment of the disclosure. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, an application configuration system (e.g., similar to one or more of the systems described herein with respect to FIGS. 1A-1C) may perform one or more of the steps of process flow 300. For example, an application configuration system (e.g., the system 130 described herein with respect to FIGS. 1A-1C) may perform the steps of process flow 300.

As shown in block 302, the process flow 300 of this embodiment includes create a catalog, wherein the catalog comprises one or more suggested application configurations.

In some embodiments, the catalog may include standardized application configurations, semi-standardized application configurations, non-standardized application configurations, a combination of any of the foregoing, and/or the like. In some embodiments, the standardized application configurations may include application configurations created by approved users of the system (e.g., developers, technicians, managers, and/or the like). In some embodiments, the standardized application configurations may include application configurations that have been tested, vetted, validated, approved, and/or the like by the approved users of the system. In this way, the standardized application configurations may include pre-created application configurations.

In some embodiments, the semi-standardized application configurations may include application configurations created (e.g., pre-created) by approved users of the system. In some embodiments, the semi-standardized application configurations may include variations, settings, parameters, and/or the like that may be configured (e.g., reconfigured) by users of the system (e.g., application requestors, subject matter experts, and/or the like). In this way, the semi-standardized application configurations may provide a structure of an application configuration that allows for the user to customize the application configuration further to suit the needs of the particular process. For instance, and by way of non-limiting example, a semi-standardized application configuration may include preconfigured settings for source code of an application. The user (e.g., application requestor or subject matter expert) may then customize the source code further for the particular application.

In some embodiments, the non-standardized application configurations may include application configurations that may be fully customizable by the user. In this way, the user (e.g., application requestor or subject matter expert) may configure (e.g., reconfigure) the entire application configuration to suit the needs of the particular application. For instance, and by way of non-limiting example, if a non-standardized application configuration relates to setting up a new server and includes configurations for set up, install, and running the new server, a user may reconfigure all of the parameters associated with setting up a new server.

As shown in block 304, the process flow 300 of this embodiment includes receive, from the user, a user selection, wherein the user selection comprises the one or more suggested application configurations. In some embodiments, the user selection may include functions to allow for the user to interact with the catalog of application configurations. In some embodiments, the user may access the catalog through a user device (e.g., a personal computer, mobile device, end-point device, and/or the like), and may include accessibility options through a web portal, desktop application, command line interface, and/or the like. In some embodiments, search tools may be incorporated into the catalog to allow for organization and searchability of the catalogs (e.g., hierarchy of application configurations based on functionality, name, suggested configurations, and/or the like).

In some embodiments, the user selection may include requesting, from the user, additional details relating to the specific application configuration, such as a description, impact on system performance or functionality, prerequisites or dependencies, and/or the like. In some embodiments, the application configuration system may provide assistance in the form of instructions to prompt the user on next steps associated with the application configuration. In some embodiments, the user may provide feedback to the application configuration system on the particular application configuration selected. In some embodiments, the feedback may be shared throughout the application configuration system and allow for future users to see the feedback.

As shown in block 306, the process flow 300 of this embodiment includes implement, in response to the user selection, the one or more suggested application configurations. In some embodiments, implementing the suggested application configurations may include preparing the application configuration system to implement the application configuration. In this way, the system may need to be in a specific state to accept (e.g., install) the application configurations. In some embodiments, the application configuration system may automatically create a back up version prior to implementing the application configuration.

In some embodiments, the application configurations may be implemented through manual operation of a user, automated operation of the application configuration system, or a combination of the foregoing. In some embodiments, the catalog may prompt the user to implement the application configuration.

In some embodiments, the application configuration may be tested. In some embodiments, the application configuration may automatically test the application configurations. In some embodiments, the user may test the application configurations. In some embodiments, the testing may test certain system behavior to ensure the application configuration was implemented correctly. In some embodiments, the application configuration system may diagnose issues that may arise during implementing the application configuration.

FIG. 4 is a process flow 400 which illustrates a process flow of an example process associated with example embodiments described herein. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, an application configuration system (e.g., similar to one or more of the systems described herein with respect to FIGS. 1A-1C) may perform one or more of the steps of process flow 400. For example, an application configuration system (e.g., the system 130 described herein with respect to FIGS. 1A-1C) may perform the steps of process flow 400.

As shown in block 402, the process flow 400 of this embodiment includes an application requestor. In some embodiments, the application requestor may include a user. In some embodiments, the application requestor may include a subject matter expert. In some embodiments, the application requestor may impersonate a system user. In this way, the application requestor may impersonate the system user on a code branch named based on the identity of the application requestor.

As shown in block 404, the process flow 400 of this embodiment includes a user interface. In some embodiments, the user interface may allow the application requestor to make changes to configurations (e.g., application configurations). In some embodiments, the application requestor may be limited in ability to make changes to certain application configurations. In some embodiments, the limitation may be in response to the application requestor's subject matter expertise.

As shown in block 406, the process flow 400 of this embodiment includes a filesystem. In some embodiments, the filesystem may include a lower level configuration and a production configuration. In some embodiments, the application requestor (e.g., user) may have access to make changes to the lower level configuration filesystem. In some embodiments, the application requestor may push these changes to the production configuration filesystem. In some embodiments, the production configuration filesystem may be sent (e.g., transmitted) to the version control tool (e.g., version control tool 414).

As shown in block 408, the process flow 400 of this embodiment includes component catalogs. In some embodiments, the component catalogs may include build configuration (e.g., application configurations, or the like) that may be selected by the application requestor in the user interface 404. In some embodiments, the component catalogs may contain prebuilt application configurations. In some embodiments, the component catalogs may contain instructions on how the application requestor may build an application configuration. In this way, the application configuration system may, through the component catalogs, present the user (e.g., application requestor) with options for an application configuration. In some embodiments, the application configuration may present the user with application configurations based on the user inputting parameters the user wishes the application configuration conforms to.

As shown in block 410, the process flow 400 of this embodiment includes a logging tool admin. In some embodiments, the logging tool admin may be an administrator of the application configuration system. In some embodiments, the logging tool admin may approve or deny the application requestor's application configurations. In some embodiments, the logging tool admin may reconfigure the application requestor's application configurations (e.g., reconfigure the application configurations in response to the application configuration system's requirements).

As shown in block 412, the process flow 400 of this embodiment includes admin review. In some embodiments, the admin review is performed by the logging tool admin 410. In some embodiments, the admin review may include an uncertainty analysis of the application configuration. In some embodiments, the admin review may be performed by the application configuration system. In some embodiments, the application configuration system may approve or deny the application configuration.

As shown in block 414, the process flow 400 of this embodiment includes a version control tool. In some embodiments, the version control tool may be similar to the version control tool mentioned previously. In some embodiments, the version control tool may receive the application configuration from the user interface 404. In some embodiments, the logging tool admin 410 may perform the admin review 412 using the version control tool 414. In some embodiments, the version control tool may store the latest version of the application configuration. In some embodiments, the application configuration system may pull the latest application configuration from the version control tool to the filesystem, and/or vice versa.

As shown in block 416, the process flow 400 of this embodiment includes a deployment pipeline. In some embodiments, the application configuration system may continuously integrate application configurations to the deployment pipeline. In some embodiments, the deployment pipeline deploys the application configurations to the configuration manager.

As shown in block 418, the process flow 400 of this embodiment includes a configuration manager. In some embodiments, the configuration manager may receive application configurations from the deployment pipeline. In some embodiments, the configuration manager may organize and manage the application configurations that will be sent to the devices (e.g., devices 420).

As shown in block 420, the process flow 400 of this embodiment includes one or more devices. In some embodiments, the devices may include workstations, servers, ATMs, personal computers, desktop computers, mobile phones, and/or the like. In some embodiments, the devices may continuously check with the application configuration system to determine any new application configurations. In this way, the devices may check with the deployment pipeline and/or the configuration manager to get the latest application configurations.

As shown in block 422, the process flow 400 of this embodiment includes one or more log indexers. In some embodiments, the log indexers may store, organize, manage, and/or the like the application configurations. In some embodiments, the log indexers may create log files associated with the application configurations. In some embodiments, the log files may monitor key aspects of the application configurations. In some embodiments, the log files may capture data associated with system logs, application logs, security logs, web server logs, database logs, network logs, event logs, transaction logs, audit logs, performance logs, error logs, backup and recovery logs, communication logs, domain name system logs, dynamic host configuration protocol logs, and/or the like.

In some embodiments, the log files may capture data associated with latency and/or response time, throughput of an application, resource utilization (e.g., computer resources, network resources, memory resources, and/or the like), error rates, availability and/or uptime, concurrency, database interaction metrics, business specific metrics, user engagement, backlogs, and/or the like.

As shown in block 424, the process flow 400 of this embodiment includes one or more log analytics. In some embodiments, the log analytics may include the ability for users of the application configuration system to view the log analytics associated with the application configurations. In some embodiments, users such has production support, application developers, network engineers, managers, technicians, application requestors, logging tool administrators, and/or the like may view the log analytics. In some embodiments, the log analytics may be presented to the users with visual representations of the log files.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for configuring application configurations using advanced computational models for data analysis and automated decision-making, the system comprising:
   a processing device;
   a non-transitory storage device containing instructions when executed by the processing device, causes the processing device to perform the steps of:
      receive, from a user, one or more application configurations, wherein the application configurations comprise configurations to one or more log files;
      receive, in response to the one or more application configurations, one or more approvals, wherein the one or more approvals are associated with an administrator;
      update one or more applications with the one or more application configurations, wherein the update is associated with a version control tool, and wherein the version control tool stores the one or more application configurations;
      transmit the one or more applications to a production environment; and
      generate a change interface component, wherein the change interface component comprises data associated with the one or more applications.

2. The system of claim 1, wherein receiving the one or more application configurations further comprises:
   receiving, from the user, the one or more application configurations, wherein the user is a subject matter expert; and
   permitting, based on a subject matter of the one or more application configurations, the user to reconfigure the one or more application configurations.

3. The system of claim 2, wherein receiving, from the user, the one or more application configurations further comprises:
   receiving, from the user, a request for the application configuration;
   creating, using an artificial intelligence model, one or more configuration recommendations in response to the request for the application configuration; and
   implementing, in response to the user selecting the one or more configuration recommendations, the one or more configuration recommendations.

4. The system of claim 1, wherein generating the change interface component further comprises transmitting, to a user device, the change interface component, and wherein the change interface component configures a graphical user interface of the user device.

5. The system of claim 1, wherein the production environment comprises one or more devices.

6. The system of claim 1, wherein executing the instructions further causes the processing device to:
   monitor the version control tool for a latest application configuration, wherein the version control tool is monitored on a time interval; and
   transmit the latest application configuration to the production environment on a regular time interval.

7. The system of claim 1, wherein executing the instructions further causes the processing device to:

create a catalog, wherein the catalog comprises one or more suggested application configurations;
receive, from the user, a user selection, wherein the user selection comprises the one or more suggested application configurations; and
implement, in response to the user selection, the one or more suggested application configurations.

8. A computer program product for configuring application configurations using advanced computational models for data analysis and automated decision-making, the computer program product comprising a non-transitory computer-readable medium comprising code causing an apparatus to:
receive, from a user, one or more application configurations, wherein the application configurations comprise configurations to one or more log files;
receive, in response to the one or more application configurations, one or more approvals, wherein the one or more approvals are associated with an administrator;
update one or more applications with the one or more application configurations, wherein the update is associated with a version control tool, and wherein the version control tool stores the one or more application configurations;
transmit the one or more applications to a production environment; and
generate a change interface component, wherein the change interface component comprises data associated with the one or more applications.

9. The computer program product of claim 8, wherein receiving the one or more application configurations further comprises:
receiving, from the user, the one or more application configurations, wherein the user is a subject matter expert; and
permitting, based on a subject matter of the one or more application configurations, the user to reconfigure the one or more application configurations.

10. The computer program product of claim 9, wherein receiving, from the user, the one or more application configurations further comprises:
receiving, from the user, a request for the application configuration;
creating, using an artificial intelligence model, one or more configuration recommendations in response to the request for the application configuration; and
implementing, in response to the user selecting the one or more configuration recommendations, the one or more configuration recommendations.

11. The computer program product of claim 8, wherein generating the change interface component further comprises transmitting, to a user device, the change interface component, and wherein the change interface component configures a graphical user interface of the user device.

12. The computer program product of claim 8, wherein the production environment comprises one or more devices.

13. The computer program product of claim 8, the code further causes the apparatus to:
monitor the version control tool for a latest application configuration, wherein the version control tool is monitored on a time interval; and
transmit the latest application configuration to the production environment on a regular time interval.

14. The computer program product of claim 8, the code further causes the apparatus to:
create a catalog, wherein the catalog comprises one or more suggested application configurations;
receive, from the user, a user selection, wherein the user selection comprises the one or more suggested application configurations; and
implement, in response to the user selection, the one or more suggested application configurations.

15. A method for configuring application configurations using advanced computational models for data analysis and automated decision-making, the method comprising:
receiving, from a user, one or more application configurations, wherein the application configurations comprise configurations to one or more log files;
receiving, in response to the one or more application configurations, one or more approvals, wherein the one or more approvals are associated with an administrator;
updating one or more applications with the one or more application configurations, wherein the update is associated with a version control tool, and wherein the version control tool stores the one or more application configurations;
transmitting the one or more applications to a production environment; and
generating a change interface component, wherein the change interface component comprises data associated with the one or more applications.

16. The method of claim 15, wherein receiving the one or more application configurations further comprises:
receiving, from the user, the one or more application configurations, wherein the user is a subject matter expert; and
permitting, based on a subject matter of the one or more application configurations, the user to reconfigure the one or more application configurations.

17. The method of claim 16, wherein receiving, from the user, the one or more application configurations further comprises:
receiving, from the user, a request for the application configuration;
creating, using an artificial intelligence model, one or more configuration recommendations in response to the request for the application configuration; and
implementing, in response to the user selecting the one or more configuration recommendations, the one or more configuration recommendations.

18. The method of claim 15, wherein generating the change interface component further comprises transmitting, to a user device, the change interface component, and wherein the change interface component configures a graphical user interface of the user device.

19. The method of claim 15, wherein the production environment comprises one or more devices.

20. The method of claim 15, wherein the method further comprises:
monitoring the version control tool for a latest application configuration, wherein the version control tool is monitored on a time interval; and
transmitting the latest application configuration to the production environment on a regular time interval.

* * * * *